Figure 1:
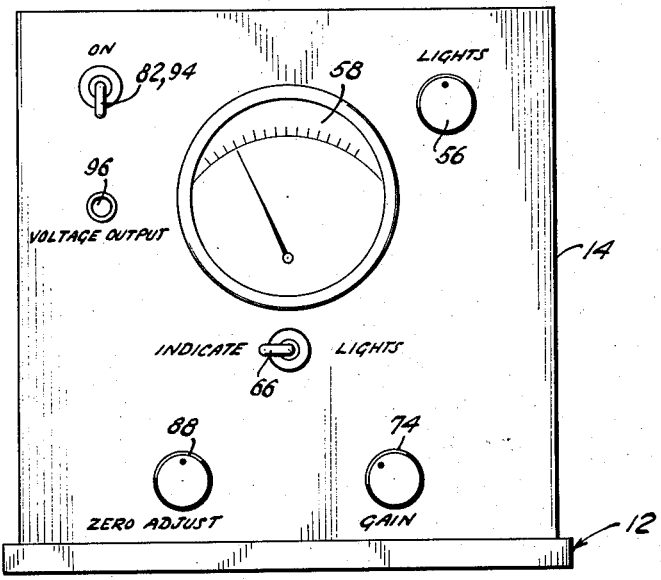

May 30, 1961  S. NEWMAN  2,986,065
DIFFUSE REFLECTIVITY METER
Filed March 29, 1957  2 Sheets-Sheet 1

INVENTOR
SAM NEWMAN
BY George Sipkin
Lee J. Kreutberger
ATTORNEYS

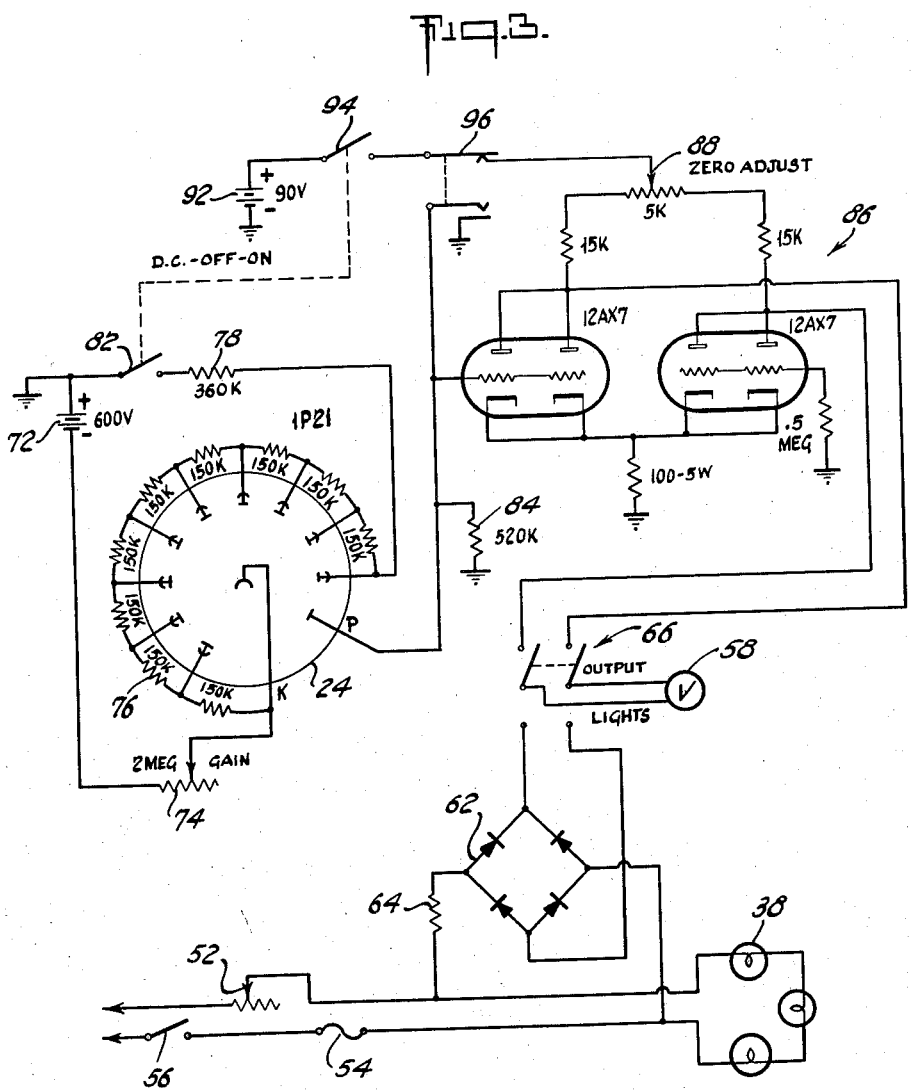

United States Patent Office 2,986,065
Patented May 30, 1961

2,986,065
DIFFUSE REFLECTIVITY METER
Sam Newman, 50—14 Broadway, Woodside 77, N.Y.
Filed Mar. 29, 1957, Ser. No. 649,579
4 Claims. (Cl. 88—14)
(Granted under Title 35, U.S. Code (1952), sec. 266)

The invention described herein may be manufactured and used by or for the Government of the United States of America for governmental purposes without the payment of any royalties thereon or therefor.

This invention relates to a diffuse reflectivity meter and more particularly to a diffuse reflectivity meter that is portable and can be positioned adjacent any selected area of a surface that is small and substantially flat to meter diffused light emanating from the selected area in a direction perpendicular thereto.

Diffuse reflectivity is the ratio of the amount of light diffusely scattered from a surface to the amount of light diffusely scattered from a perfectly white surface.

This invention has particular utility in ascertaining some characteristics of a dark trace tube screen. A dark trace tube is a cathode ray tube with a light absorbing screen, a scotophor, rather than a light emitting screen, a phosphor, as in conventional cathode ray tubes. The screen material of a dark trace tube is an alkali halide; potassium chloride is commonly used as the screen material. When electrons with an energy on the order of ten kilovolts collide with the screen, color centers or F-centers are formed in the crystalline matrix of the screen material. The color centers or F-centers absorb light in the yellow-green region of the spectrum whereby there appears a magenta coloration. Since light reaching the dark trace tube screen is divided into one part that passes through, a second part that is absorbed by the screen, and a third part that is diffused, the diffuse reflectivity of the screen is changed with the creation of color centers in the screen because more light is absorbed and less is diffused. The extent of the change of diffuse reflectivity is a function of the density of color centers. This invention is adapted to measure diffuse reflectivity of a dark trace tube screen for any color center density.

Several significant screen characteristics are ascertainable from diffuse reflectivity measurements. First, there is signal contrast on the screen which is the percent change in diffuse reflectivity of the screen material caused by the incident electron beam as compared to the blank screen or before the display of a signal. Then there are tonal range, signal buildup by either continuous or pulsed bombardment, erasure speed, comparison of focus on-center and off-center, and rate of decay all of which are ascertainable from diffuse reflectivity measurements.

This invention also has utility for ascertaining the corresponding characteristics of black-and-white and color tubes, particularly decay, and also the diffuse reflectivity of reflectors.

Briefly, the invention includes a black serrated tube adapted to be positioned perpendicular to and a short distance from a preselected area of a test surface. Several conventional light bulbs are supported around the tube. A rheostat is connected in series with the bulbs and the combination of rheostat and bulbs is adapted to be connected to and disconnected from a suitable power supply by a switch. A meter is adapted to indicate the voltage across the bulbs whereby the luminous flux emitted by the bulbs may be set to a desired level by means of the rheostat. Because the same meter is adapted to measure the diffuse reflectivity it is connected to a double-pole double-throw switch whereby it can indicate either lamp voltage or diffuse reflectivity. A photomultiplier is mounted adjacent the other end of the black tube; a photopic filter is mounted between the photomultiplier and the end of the black tube to render the sensitivity of the photomultiplier as much like the eye as possible. The length of the black tube, the distance between one end thereof and the photomultiplier, and the distance between the other end of the tube and the diffusing surface is set so as to focus the selected area of diffusing surface on the cathode of the photomultiplier. A sighting arrangement is provided for obtaining proper alignment of black tube and the selected area of diffusing surface. A differential amplifier is connected to the output of the photomultiplier. The meter is adapted to be connected to the output of the differential amplifier by means of the double-pole double-throw switch. The differential amplifier includes a zero adjustment for dark current. The photomultiplier circuit includes a gain control which is set till full scale deflection is obtained on the meter when the selected surface area is white or is otherwise the standard for comparison. The entire invention is mounted on an adjustable tripod; the platform of the tripod is tiltable in any direction.

An object of this invention is to provide a diffuse reflectivity meter.

A further object is to provide a diffuse reflectivity meter particularly adapted to taking measurements on dark trace tube screens.

A further object is to provide a diffuse reflectivity meter that is adjustable, portable, compact and easy to use both in the laboratory and in the field.

A further object is to provide a diffuse reflectivity meter that also can measure transmittance.

A further object is to provide a diffuse reflectivity meter that may be used at various light levels and whose operation is simple, trouble-free, and stable.

Figure 2:
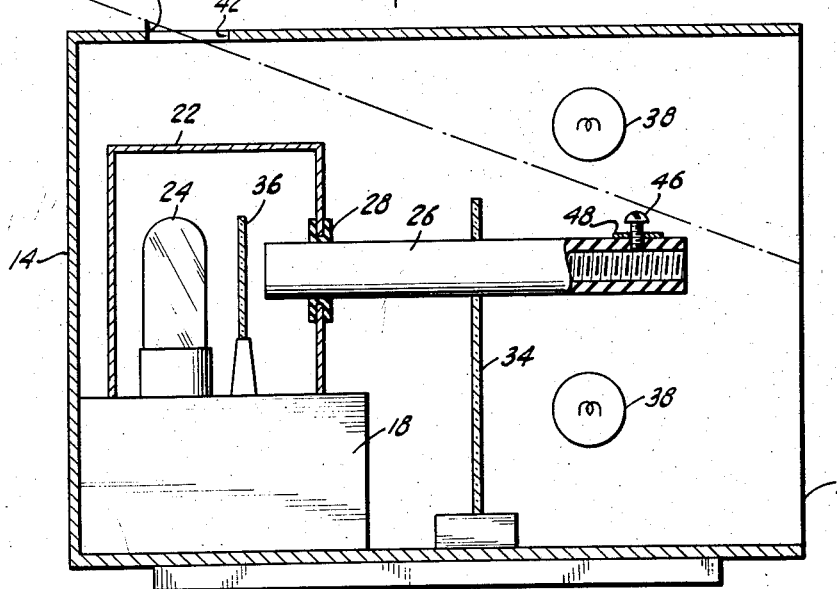

Other objects and many of the attendant advantages of this invention will be readily appreciated as the same becomes better understood by reference to the following detailed description when considered in connection with the accompanying drawings wherein:

Fig. 1 is front view of the invention,
Fig. 2 is side sectional view of the invention showing only those elements necessary for explaining the invention, circuit elements, knobs, meter, and fastenings being intentionally omitted, and
Fig. 3 is a circuit diagram of the invention.

The diffuse reflectivity meter mount is a universally adjustable tripod 12. Only the mounting platform of the tripod is shown in Fig. 1. The tripod 12 is any of various commercial varieties having a platform which is adjustable vertically, rotatable about a vertical axis and tiltable. A housing 14 open on side 16 is secured on the platform of the tripod 12. A chassis 18 is mounted in the housing. On the chassis 18 is mounted a black light-sealed can 22. Within the can, a photomultiplier 24 is rigidly mounted. A black tube 26 that is internally serrated along its entire length is supported at one end thereof by the can 22 in alignment with the cathode of photomultiplier 24. Suitable light sealing means 28 such as a black rubber grommet engages the tube 26 in the opening of the can 22. Tube 26 is further supported by a member 34 which is secured to housing 14. A photopic filter 36 is supported between the end of tube 26 and the photomultiplier 24 to correct the spectral response of the photomultiplier 24 to simulate the response of the human eye. A plurality of lights 38 are mounted around the tube 26. The top of housing 14 is formed with a slot 42 which permits air circulation. A fiducial mark 44 is formed adjacent the slot 42. An adjustable member such as a screw threadedly engages the tube 26 and extends vertically therefrom. The screw 46 is adapted to be secured by a locknut 48. The open end of the housing is adapted to abut the surface under test, e.g., the face of the dark trace tube.

To design an embodiment of the above-described combination, the area of the target is selected. The smallest photomultiplier practical for the conditions is selected. The useful area of the photomultiplier cathode, which is considerably less than total cathode area, is ascertained from available literature. The area of the target and the useful area of the cathode on which it is to be focussed is established. The next consideration is that the distance between target area and cathode should be minimal. However, since the housing 14 supports various circuit and structural elements, the distance need not be smaller than the distance made available by the housing 14. Having established the distance, it is necessary to design a focus device for focussing light rays that leave the target in a direction normal and substantially normal thereto. Though a lens system could be used it would be expensive and not sufficiently rugged. Instead a black tube is mounted between the target area and the cathode for focussing. From established principles of optics the relationship of inside diameter and length of tube 26, the space between one end thereof and the cathode of the photomultiplier and the other end thereof and the target area all may be calculated to focus the target area on the cathode. Any one of many designs can satisfy the focus requirements; no one dimension is critical. As a matter of fact the proper combination of variables can be arrived at empirically by changing one or two of the variables to fixed quantities and changing the remaining variables until focus is established. It is to be noted that the spacing between the target area and the end of tube 26 is adequate to permit the bulbs 38 to illuminate the target area. The bulbs 38 are small, preferably six volt bulbs. A sighting arrangement is provided similar to that on a rifle for enabling alignment of the tube 26 with the target area. The sighting arrangement includes the head of screw 46 and the mark 44. When the mark 44 and the head of screw 46 are in line with the center of the target area the tube 26 is aligned with the target area. The serrations in the tube 26 attenuate and substantially eliminate side effects, that is, rays of light that do not enter tube 26 parallel to the axis thereof.

The circuit diagram of the meter shown in Fig. 3 designates the parameters for one particular embodiment built and used and found to be satisfactory. The designation of parameters is not intended in a limiting sense.

The several bulbs 38 are connected in series with each other and with a light adjusting rheostat 52 and a fuse 54 and a switch 56; the bulb circuit is adapted to be connected to a suitable power supply. A battery, not shown, is included as the lamp power supply to permit use in the field. Otherwise connection may be made to a direct current or alternating current line. A direct current voltmeter is adapted to be connected across the bulbs 38. Where the power supply for the bulbs 38 is A.C. there is provided a meter rectifier 62. Where the power supply will be D.C. the meter rectifier is omitted. A meter resistor 64 is provided whereby the voltage range of the meter will include the range of voltage across the bulbs 38 and the scale of the meter is properly correlated with voltage across the bulbs 38. The meter terminals are connected to the contactors of a double-pole double-throw switch 66. When the contactors of the double-pole double-throw switch engage the lower contacts, the meter 58 indicates the voltage across the bulbs. The rheostat 52 is adjusted so that voltage across the bulbs is equal to a predetermined amount. The voltage across the bulbs is measured to establish the desired light output of the bulbs.

A low-current high voltage direct current power supply 72 is provided for the photomultiplier 24. The positive terminal of the power supply 72 is connected to a source of reference hereinafter referred to as ground. A gain control rheostat 74 is connected between the cathode and the negative terminal of the power supply 72. A voltage divider including a series of resistors 76 is connected at one end to the cathode of the photomultiplier and to the plurality of dynodes in succession. A resistor 78 is connected at one end to the dynode closest to the plate. A switch 82 is connected between the other end of resistor 78 and ground. The plate of the photomultiplier 24 is connected to ground through a grid input resistor 84. The input grid of a differential amplifier is connected to the grid input resistor 84 of a differential amplifier 86. The differential amplifier is conventional and detailed description thereof is deemed unnecessary. The amplifier utilizes double triodes because higher transconductance is obtained thereby. The amplifier includes a zero adjust potentiometer 88. A power supply 92 is provided for the differential amplifier. The negative terminal of power supply 92 is grounded. A switch 94 is connected between the positive terminal of power supply 92 and the tap of the zero adjust potentiometer 88.

The switches 82 and 94 are ganged so that the circuit may be deenergized conveniently.

The output terminals of amplifier 86, that is, the plates of the respective tubes thereof, are connected to the other two terminals of the double-pole double-throw switch 66. When the contactors of the switch 66 engage the upper contactors, the meter 58 indicates the output of the photomultiplier.

A jack socket for a recorder is indicated at 96. When a jack, not shown, is inserted, the amplifier 86 is disconnected from power supply 92; also the plate of the photomultiplier is connected through the recorder to ground. This arrangement is indicated so that a commercial recorder may be plugged in to record the output of the photomultiplier. The amplifier is deactivated as explained above when the recorder plug is inserted into the jack socket.

In utilizing the invention to measure diffuse reflectivity of the face of a dark trace tube it is necessary first to adjust the circuits of the dark trace tube being tested. The deflection circuits are adjusted until a raster of the required area and in the desired position is written on the face of the tube. This may take a little time since the proper setting of the deflection circuits is arrived at by trial and error and since the tube face must be erased after each try. Then the desired beam current is established. The various electrode voltages established at preselected levels and maintained at those levels except for one of the electrodes whose potential is made such that the beam is normally cutoff; the one electrode is adapted to be pulsed so that the beam current is turned on during the pulse interval and for one or more complete frames. All these preliminary settings are necessary since the coloration, the diffuse reflectivity and the absorptivity of the screen are functions of color center density, and color center density is affected by each of the aforementioned variables. The scotophor stores the image for hours without appreciable decay. The charge density of the pulsed raster is therefore dependent on the following factors:

The area of the raster
The duration of time the pulse is written
The beam current of the dark trace C.R.T.
The focussing of the beam
The location of the raster on the face of the dark trace C.R.T.

After the dark trace tube circuitry is set, the tripod 12 is positioned so that the open end of the housing 14 abuts the face of the dark trace tube. A raster is written by the preset circuitry as an aid in adjusting the tripod 12. The platform of tripod 12 is adjusted until the mark 44 and the head of screw 46 is in line with the center of the raster and the open end of housing 14 abuts the face of the dark trace tube. Then the tube 26 is in line with the raster or target area. Then the raster is erased. The light switch 56 is turned on and the meter switch 66 is moved to the position for indicating voltage across the lights. The rheostat 52 is adjusted until the voltage across the lights is at the predetermined level. Then the light switch 56 is moved to off and the meter switch 66 is thrown to output position and the ganged switches 82 and 94 are moved to on position. The recorder mentioned above is not connected to the circuit at this time. The zero adjust potentiometer 88 is adjusted until the meter deflection is zero. Then the light switch 56 is turned on and the gain rheostat 74 is adjusted until the meter deflection is one hundred percent. The dark trace tube is pulsed to write a raster of one or more frames. Neglecting the transistory phosphorescence during the interval the pulse is written, the meter indicates the diffuse reflectivity as a percentage of the diffuse reflectivity before the raster was written. To obtain a recording of tonal range, buildup, decay, erasure speed and other characteristics of the screen material, the recorder is plugged in and thereby substituted for the amplifier and meter circuit. The recorder is adjusted for zero and one hundred percent deflection in the same way described above for the meter.

This invention has been described in connection with dark trace tubes, actually it has many other uses. Some of these are the measurements of phosphor characteristics of bright trace tubes, such as P7 and P11. The decay of a bright trace tube can be measured by adjusting the recorder for 100% when the tube is at maximum brightness and zero percent when the C.R.T. is cut off. Measurements of contrast, intensity, and fluorescence can be measured. Other applications where light reflective or transmitting surfaces are used can be measured by comparison to a standard surface or by comparison to similar surface. Examples are surfaces of lighting projectors, matte diffusing surfaces, points, colored surfaces, clear and opalescent surfaces, and translucent glasses or plastics.

Obviously many modifications and variations of the present invention are possible in the light of the above teachings. It is therefore to be understood that within the scope of the appended claims the invention may be practiced otherwise than as specifically described.

I claim:

1. A diffuse reflectivity meter comprising support means, a phototube mounted on said support means, an internally serrated black tube mounted on said support means in line with the useful area of the cathode of said phototube, a black light-tight can mounted on said support means and enclosing said phototube and the adjacent end of said black tube, lighting means emitting visible light mounted on said support means and disposed about the other end of said black tube but out of the direct line of sight of the tube, position adjustable means supporting said support means, adjustable power supply means including an on-off switch connected to said lighting means, power supply means including gain control means connected to said phototube, differential amplifier means including a zero adjust means connected to said phototube, meter means adapted to be connected across said lighting means to indicate the voltage thereacross and also adapted to be connected to the output of said amplifier means whereby the voltage output of said amplifier means may be indicated.

2. A diffuse reflectivity meter as defined in claim 1 further including a photopic filter disposed between said phototube and said black tube to cause the spectral response of said phototube to approximate that of the human eye.

3. A diffuse reflectivity meter as defined in claim 1 wherein said support means is a box with one open side and said black tube is normal to the open side of said box and terminates short of the open side, the open side of said box being adapted to be placed approximately against a surface whose diffuse reflectivity characteristics are to be ascertained.

4. A diffuse reflectivity meter as defined in claim 3 wherein the top of said box near the side opposite the open side is formed with an opening, a fiducial mark on said box adjacent the opening, a raised element secured to the upper end portion of said black tube nearest the open side of said box whereby said black tube is aligned with a selected area of said surface when said fiducial mark and said raised element and the center of said area are in line.

References Cited in the file of this patent

UNITED STATES PATENTS

| | | |
|---|---|---|
| 1,794,134 | Baker et al. | Feb. 24, 1931 |
| 2,165,054 | Johnson | July 4, 1939 |
| 2,542,299 | Archer et al. | Feb. 20, 1951 |
| 2,632,358 | Ehat | Mar. 24, 1953 |
| 2,710,924 | Morrison et al. | June 14, 1955 |
| 2,797,334 | Sweet | June 25, 1957 |
| 2,852,693 | Hughes et al. | Sept. 16, 1958 |

FOREIGN PATENTS

| | | |
|---|---|---|
| 530,724 | Great Britain | Dec. 18, 1940 |